United States Patent [19]

Russo

[11] 4,090,238
[45] May 16, 1978

[54] PRIORITY VECTORED INTERRUPT USING DIRECT MEMORY ACCESS

[75] Inventor: Paul Michael Russo, Princeton, N.J.

[73] Assignee: RCA Corporation, New York, N.Y.

[21] Appl. No.: 729,348

[22] Filed: Oct. 4, 1976

[51] Int. Cl.² .................... G06F 9/18; G06F 13/00
[52] U.S. Cl. .................................................. 364/200
[58] Field of Search ........................... 364/200, 900

[56] References Cited

U.S. PATENT DOCUMENTS

| | | | |
|---|---|---|---|
| 3,665,415 | 3/1972 | Beard et al. | 340/172.5 |
| 3,766,526 | 10/1973 | Buchanan | 340/172.5 |
| 3,800,287 | 3/1974 | Albright | 340/172.5 |
| 3,833,888 | 9/1974 | Stafford et al. | 340/172.5 |
| 3,905,025 | 9/1975 | Davis et al. | 340/172.5 |
| 3,943,495 | 3/1976 | Garlic | 340/172.5 |
| 3,944,985 | 3/1976 | Brandstaetter et al. | 340/172.5 |

*Primary Examiner*—Mark E. Nusbaum
*Attorney, Agent, or Firm*—H. Christoffersen; Samuel Cohen; Carl M. Wright

[57] ABSTRACT

Circuit for receiving service request signals from peripheral devices in a computer system and providing an address to the computer to effect a program transfer to an appropriate service subroutine. An interrupt request signal is generated to cause the computer to jump to a subroutine. A DMA (direct memory access) request is used to store the address at which the proper subroutine is stored. The proper subroutine depends on the highest priority device supplying a service request signal and on the status of that device. Provision is also made for storing a double-length address.

5 Claims, 3 Drawing Figures

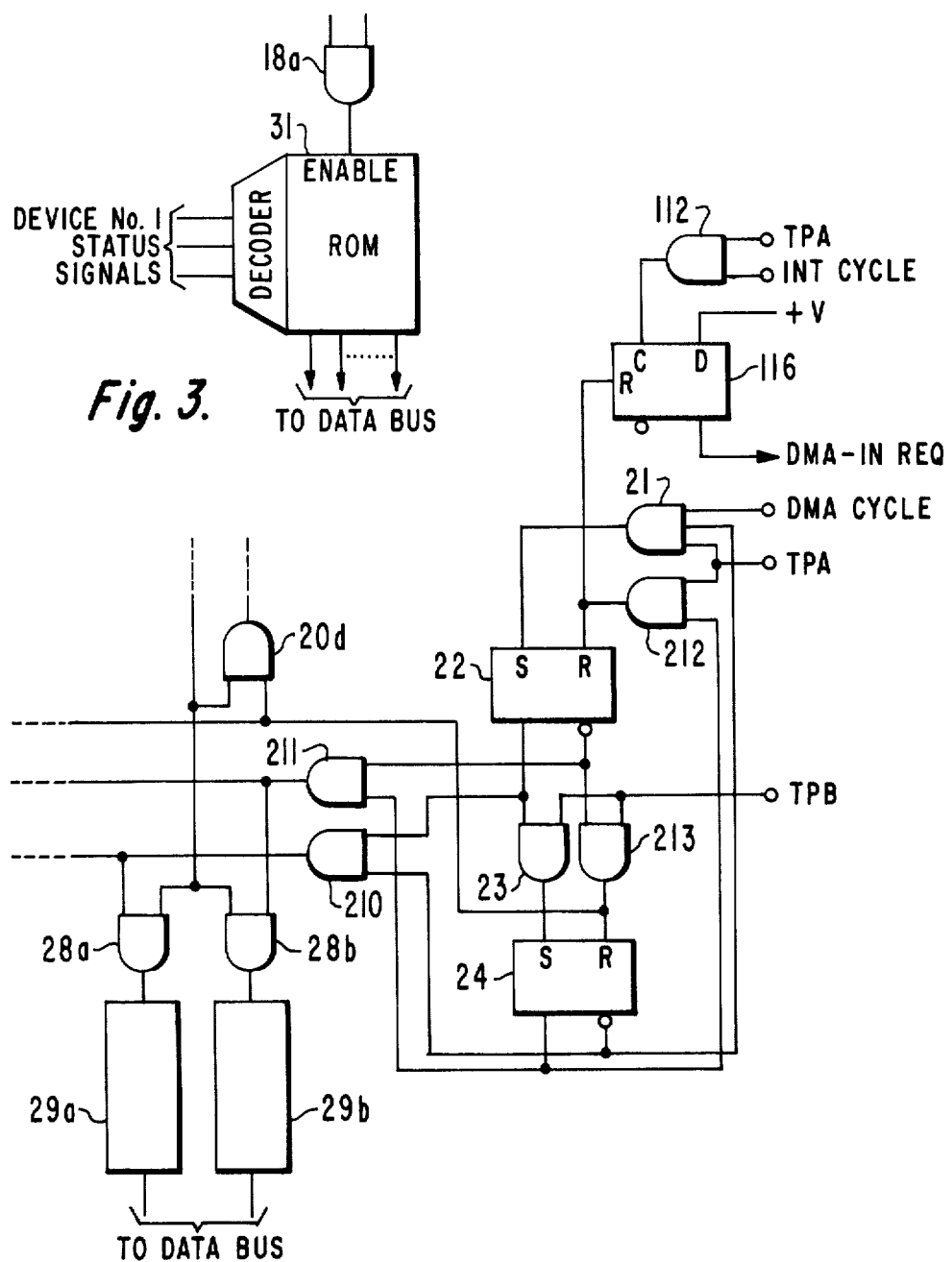

PRIORITY VECTORED INTERRUPT USING DIRECT MEMORY ACCESS

This invention relates to stored program digital computers having an interrupt facility.

In the stored program digital computer art, an interrupt is understood to mean a temporary suspension or break in the normal operation of executing sequential instructions so that the processor can service an external device or branch to a predetermined place in the instruction stream in response to an external signal. Peripheral devices providing data storage used in conjunction with the processor operate at speeds which are very slow in comparison to the speed of operation of the processor. Interrupts provide a means for permitting the processor to execute instructions while waiting to service the peripheral devices, i.e., to provide data to be written to the device, to accept data read from the device, or to terminate the device's operation. Another use of interrupts makes programs more versatile and general in application by permitting the operator to indicate which of several optional branches should be taken during the execution of the program depending on some external criteria. This is sometimes accomplished by switches, called break points, which are sensed by the machine using special instructions for that purpose.

There is usually only one interrupt input signal in a processor. When several devices are capable of interrupting, their interrupt request signals are ORed together to provide a single processor interrupt signal. Activation of the interrupt signal causes the processor to branch to a first subroutine that determines which device caused the interrupt signal and which service subroutine should next be executed. One method of identifying the interrupting device is polling where external flag lines are used to identify the device or where each device is interrogated in turn by a special instruction until an active device is found.

A priority interrupt system is used in systems having devices that must be serviced at a faster rate than others. For example, a high-speed magnetic tape reader must be serviced more often than a paper tape reader because the character rate is greater and allowable buffer time is shorter because of the higher data flow speed. The problem is one of determining not only which device requested an interrupt but also which of several interrupting devices has the highest priority and should therefore be serviced first.

A vectored interrupt is an interrupt providing a plurality of responses to the interrupt signal. Sometimes several interrupt lines are provided. In the case of a single interrupt line, a subroutine is used to scan or to poll the possible sources of interrupt and to determine from the results which subroutine or program branch is to be executed.

Prior art systems utilizing interrupts require substantial software support which increases the processor time required for vectored interrupts. If priority interrupts are also necessary, more complex software is required and the servicing of interrupts uses more processor time. In microprocessors, where the instructions are usually more basic than in larger machines, many instructions may be required to perform priority or vectored interrupt servicing, or both.

Some computer processing units include a direct memory access (DMA) facility for storing data from external sources directly into the memory or for retrieving data directly from the memory without disturbing the execution of the current program. This is usually accomplished by generating a special machine cycle, logically called a DMA cycle, which couples a register known as a pointer to the memory address bus and which stores data in the memory or retrieves data from the memory at the addressed location depending on whether the DMA request was for input or output. Since the program execution requires certain cycles, the occurrence of the DMA cycle merely suspends for one cycle time the operation of the normal program execution. This is sometimes referred to as cycle stealing.

An interruptable processor embodying the invention and having a DMA facility can be made to perform a vectored interrupt subroutine transfer with a minimum number of cycles. In operation, the service request signals from peripheral devices are applied to latches. When one of these latches is set, an interrupt request signal is generated. When the interrupt occurs, a direct memory access cycle is requested. During the DMA cycle, a priority determining circuit activates one of several signals representing the highest priority device requesting service and gates an associated predetermined address onto the data bus of the machine.

In the drawings:

FIG. 2 is a logic diagram of a modification of the circuit of FIG. 1 for use in a system where a subroutine address requires two data words; and FIG. 3 is a block diagram of a modification of a portion of the system of FIG. 1.

Figure 1:
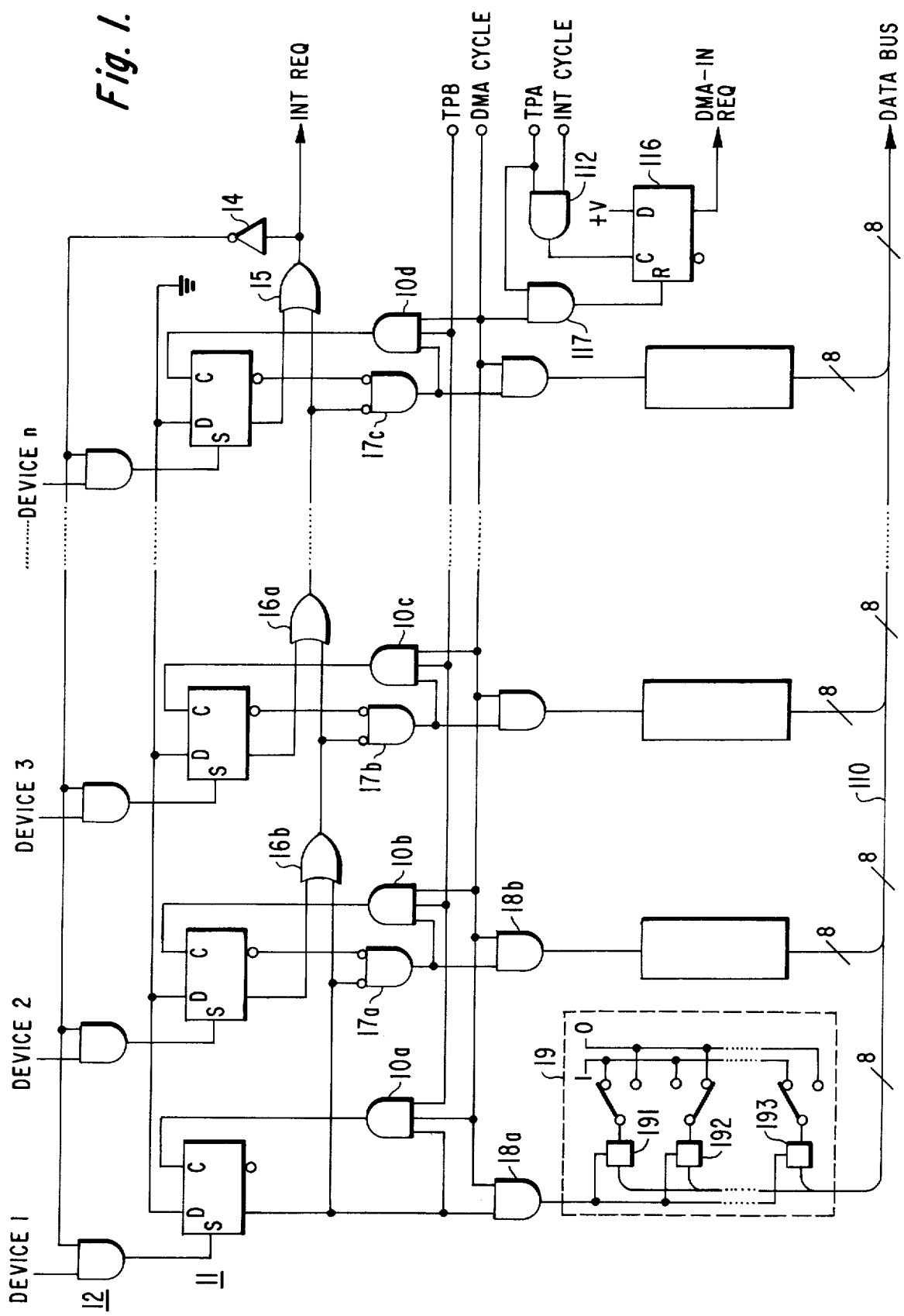
FIG. 1 is a logic diagram of an embodimdent of the invention useful in a system requiring only one data word to specify a subroutine address.

The preferred embodiment of the invention accomplishes a transfer to a subroutine related to the highest priority interrupting device by utilizing the DMA facility of the associated processor in connection with the interrupt mechanism. To describe the detailed operation of the invention, it is assumed for purposes of explanation that the preferred embodiment is used in conjunction with a COSMAC type microprocessor such as the CDP1802 (RCA Corporation). The detailed operation of a COSMAC-type microprocessor can be found in the data sheets and application notes from the manufacturer and in U.S. Pat. No. 3,970,998, assigned to the same assignee as this application. The details necessary for an understanding of the invention are included in the explanation below.

The COSMAC microprocessor has several internal states depending on the type of cycle being executed. For instance, a FETCH cycle retrieves the next instruction to be executed from the associated memory. The EXECUTION cycle performs the instruction fetched during the previous fetch cycle. Most of the COSMAC instructions require only one execution cycle although there are a few which require two such cycles. Another internal state is an INTERRUPT cycle during which the contents of the current program counter and operand pointer are stored in a special register and predetermined registers in the register array are assigned as the new program counter (R1) and as the new operand pointer (R2). The interrupt cycle is entered in response to an interrupt request signal and, in effect, suspends the program being executed and branches to another program addressed by the contents of R1.

Another internal state is the DMA cycle which is instituted by a DMA request signal. There are two DMA request signals, a DMA-IN and DMA-OUT, depending on whether the memory is to be written into or read from. A special register (RO) is the DMA pointer. This is preset to the address to which or from which the data during a DMA-IN or a DMA-OUT cycle is to be accessed. The R0 pointer is automatically incremented after each DMA cycle.

During each cycle, two time pulses (TP) are supplied from the COSMAC microprocessor. One is a TPA pulse which occurs near the beginning of the cycle. The other is a TPB pulse which occurs near the end of the cycle. The time pulses and internal state of the microprocessor are made available on external connectors, the type of cycle being indicated by means of state code signals which have a unique combination for each internal state.

To utilize the circuit of the invention, the processor's DMA pointer (R0) is initially set to the address of the address portion of a branch instruction which is addressed by the R1 interrupt pointer. By following an interrupt request with a DMA-IN request, the address to which the initial branch instruction of the interrupt routine will transfer is the location specified by the word on the data bus during the DMA cycle. A short branch instruction requires only a single byte (eight-bit) address and transfers to a location on the same "page" as the branch instruction. (A page is a group of memory locations having the same high order address bits.) A long branch instruction requires a two-byte address and transfers to any location in the memory.

In the circuit of FIG. 1, the service request signals from several devices each set a particular flip-flop of a group of flip-flops or latches 11. The service request signals are gated to the corresponding latches by AND gates 12 which are primed by the output signal from an inverter 14 when no interrupt request (INT REQ) signal is present. The interrupt request signal is generated by an OR gate 15 which is the last in a group of cascaded OR gates such as the OR gates 16a and 16b. The effect of the cascaded OR gates is to produce an interrupt request at the output terminal of the OR gate 15 when at least one of the latches 11 is set.

It is assumed in FIG. 1 that Device 1 has the highest priority, Device 2 has the next lower priority, and so on, to Device n which has the lowest priority. If several interrupt request signals occur simultaneously, the highest priority will be controlling as will be seen from the following description. If Device 1 produces a service request signal while no interrupt request is generated, the set output signal from the associated latch will prime an AND gate 18a, activate an OR gate 16b, and inhibit a NOR gate 17a. (A NOR gate operates like an AND gate considering both inputs to be true when negative as indicated by the inversion circles at the input terminals.) The output signal from the OR gate 16b inhibits a NOR gate 17b and activates the OR gate 16a. In a similar fashion, all of the NOR gates 17a-17c are inhibited by the set output signal from the latch associated with Device 1.

If Device 2 were the highest priority device requesting service, its associated latch would prime the NOR gate 17a with the reset output signal and, because the latch associated with Device 1 is not set, the NOR gate 17a would be activated, producing an output signal that primes an AND gate 18b. The lower order NOR gates are inhibited by the set output signal from the latch associated with Device 2 via the OR gates 16b, 16a, and so on. When any one of the OR gates 16 is activated, the OR gate 15 turns on and produces an interrupt request signal.

The output gates such as the AND gates 18a and 18b furnish an enabling signal to an address output device such as the switch device 19. The switch device 19 includes a plurality of transmission gates 191–193 which couple the output signal from an associated switch to a corresponding line of the data bus 110. The switches can be set to couple a logical one or zero to the corresponding data bus line when the transmission gates 191–193 are activated by the output signal from the AND gate 18a.

The interrupt cycle signal (INT CYCLE) generated in the microprocessor in response to the interrupt request (INT REQ) primes an AND gate 112 which is enabled by the TPA signal occurring during that cycle. The output signal from the AND gate 112 clocks a D-type flip-flop 116 to the set condition because the data terminal is coupled to a logical one signal (+V). The set output signal from the flip-flop 116 supplies the DMA-IN request signal. (The COSMAC architecture is arranged so that a DMA cycle is given priority after an interrupt cycle.) Following the interrupt cycle, the DMA CYCLE signal enables one of the output AND gates 18a, 18b or so on, which is primed by the priority signal. This activated AND gate turns on the associated transmission gates to couple a preset eight-bit address onto the data bus 110. The DMA CYCLE signal primes an AND gate 117 which, during the cycle's TPA signal, resets the flip-flop 116 to remove the DMA-IN request signal. The DMA CYCLE signal also primes a group of AND gates 10a–10d. The AND gates 10a–10d are also primed by the activating signal from the highest priority device. The TPB signal occurring during the DMA cycle enables one of the AND gates 10a–10d to reset the latch which initiated the previous interrupt cycle. In the example given, NOR gate 17a was enabled, priming AND gate 10b so that this AND gate becomes enabled and resets the latch 11 of Device 2. If any of the other lower order latches 11 are set, they remain set because the NOR gates 17 associated therewith are disabled. In this case, an interrupt request signal (INT REQ) is maintained which repeats the above cycle of operations (after the interrupt program is completed for the higher priority device).

The above sequence of operations continues until all of the flip-flops 11 are reset. This primes the AND gates 12 to receive the next service request signals. (The AND gates 12 prevent a higher priority latch from being reset if a higher priority latch were set just as the reset signal occurred for a lower priority device. This would cause the lower priority device to generate another interrupt because its associated latch was not reset and the higher priority device would not be serviced. Alternatively, the AND gates 12 could be inhibited during the DMA cycle which would permit high priority service requests to set their associated latches before low priority devices were serviced.)

Between each interrupt cycle and its following DMA cycle, the appropriate subroutine is executed. When an interrupt is activated, the processor inhibits further interrupts until the associated subroutine is completed.

FIG. 2 is an illustration of the logic used to modify the circuit of FIG. 1 when a two-byte branch address is to be stored. Two switch devices are required for each interrupting device and two successive DMA cycles must be generated. The flip-flop 116 and the AND gate 112 operate in the circuit of FIG. 2 in the same manner as in the circuit of FIG. 1. During a TPA pulse of the first of a pair of DMA cycles, an AND gate 21 is enabled, which sets an SR-type flip-flop 22. The set output signal from the flip-flop 22 and the reset output signal from a flip-flop 24 enable an AND gate 210, whose output signal primes one (28a) of a pair of AND gates 28a and 28b. The other input signal to the AND gates 28a and 28b is the priority decoder output signal from the high priority latch or one of the NOR gates 17a–17c. The AND gate 28a, when enabled, activates a first address word switch device 29a, which places the first byte of the two-byte address on the data bus. At the following TPB signal, the flip-flop 24 is set via an AND gate 23. The TPA signal which occurs during the second of the pair of DMA cycles enables an AND gate 212 which is primed by the set output signal from the flip-flop 24 to reset the flip flop 22. The reset output signal from the flip-flop 24 inhibits the AND gate 21 so that no set signal is applied to the flip-flop 22 during the second DMA cycle. The set output signal from the flip-flop 24 and the reset output signal from the flip-flop 22 enable an AND gate 211 whose output signal primes the second AND gate 28b of the activated interrupting device to enable the associated second switching device 29b which places on the data bus the second byte of the two-byte address.

The TPB signal occurring during the second DMA signal activates an AND gate 213 which resets the flip-flop 24. The AND gate 213 also applies an enabling signal to the reset AND gates 20d of the associated latches. The circuit of FIG. 2 produces two successive DMA-IN cycles which store two successive bytes representing the address to which the interrupt routine is to transfer. In all other respects, the circuit of FIG. 1 operates as described above.

FIG. 3 shows an alternative switch device used in place of the switch device 19. A ROM 31 is provided to couple data words selected by the status signals from the interrupting device when enabled by the output signal from the AND gate 18a as described above. This subroutine address selected from the ROM 31 and applied to the data bus depends on the reason (status) for the interrupt and provides a hardware resolution which eliminates the need for a separate resolution subroutine.

The system of the invention described above can be adopted for use in other microprocessors or computers by those of ordinary skill in the art. Those microprocessors not provided with DMA capabilities can be modified by the addition of logic networks to provide the interrupt and DMA features. (See, for example, "Increase Microprocessor Efficiency," D. C. Wyland, *Electronic Design* 23, Nov. 8, 1975, pp. 70–75 or "Speed Microprocessor Responses," E. Fischer, IBID, pp. 78–83.) Timing pulses like TPA and TPB can be decoded from the clock if the associated processor does not generate them.

What is claimed is:

1. In a computer system operating in cycles having data bus means, data storage means, direct memory access means including means for producing a DMA response signal for indicating that a DMA cycle is active, interrupt means including interrupt request means for initiating one of a plurality of interrupt routines, each of said routines stored at a different location in said data storage means, and means for producing interrupt response signals for indicating that an interrupt routine is initiated, and a plurality of peripheral device means capable of asynchronous operation for communicating with the computer system, each peripheral device means producing a service request signal, the improvement comprising:

a plurality of latching means, each responsive to a separate one of said service request signals, for storing said signal;

gating means responsive to said plurality of latching means for applying a signal to said interrupt request means;

means responsive to said interrupt response signals for initiating a direct memory access cycle;

priority means responsive to said plurality of latching means for activating one of a plurality of priority output signals indicative of the priority of the device corresponding thereto; and, output means responsive to the activated priority output signal and said DMA response signal for supplying a predetermined binary word to said data bus means, said predetermined binary word being representative of the location in said data storage means of the interrupt routine to be executed in response to said activated priority output signal.

2. The invention as claimed in claim 1 wherein the computer system includes timing means for supplying timing signals near the end of each of said cycles and the improvement further comprises resetting means responsive to said timing signals, said DMA response signal, and said activated priority signal for resetting the latching means corresponding to the activated priority signal.

3. The invention as claimed in claim 2 wherein said output means comprises:

enabling means responsive to said activated priority signal and said DMA response signal for producing an enabling signal; and switching means responsive to said enabling signal for coupling a predetermined binary value to said data bus means.

4. The invention as claimed in claim 3 wherein said predetermined binary value is selectively switchable.

5. The invention as claimed in claim 1 including means responsive to said DMA response signal for initiating a second direct memory access cycle; means for supplying a second signal indicative of said second direct memory access response; and second output means responsive to said second signal and said activated priority signal for supplying a second predetermined number to said data bus means.

* * * * *